United States Patent [19]
Gildersleeve et al.

[11] Patent Number: 5,720,991
[45] Date of Patent: Feb. 24, 1998

[54] MULTI-SHAPED RAVIOLI MAKER

[76] Inventors: Janet Gildersleeve, 1655 Silverwood Ter., Los Angeles, Calif. 90026; Ronald M. Popeil, 3950 Koval La., Las Vegas, Nev. 89109; Alan L. Backus, 11425 Rochester Ave. #23, Los Angeles, Calif. 90025

[21] Appl. No.: 639,146

[22] Filed: Apr. 29, 1996

Related U.S. Application Data

[63] Continuation of Ser. No. 242,814, May 16, 1994, abandoned.

[51] Int. Cl.$^6$ ....................................................... B26F 3/00
[52] U.S. Cl. .......................... 425/298; 425/296; 425/303; 425/304; 30/301; 30/302; 30/316; 83/618; 83/652; 83/932
[58] Field of Search .................... 30/301, 302, 316; 83/618, 652, 932; 425/296, 298, 303, 304; 426/503, 518

[56] References Cited

U.S. PATENT DOCUMENTS

| | | | |
|---|---|---|---|
| 139,217 | 5/1873 | Webster | 425/398 |
| 170,460 | 11/1875 | Ashbourne | 425/298 |
| 2,106,009 | 1/1938 | Lee | 426/512 |
| 2,119,260 | 5/1938 | Valle | 30/301 |
| 3,001,485 | 9/1961 | Czik | 425/183 |
| 4,076,476 | 2/1978 | Ventura | 425/183 |

*Primary Examiner*—Jay H. Woo
*Assistant Examiner*—Minh-Chau T. Pham
*Attorney, Agent, or Firm*—Keck, Mahin & Cate

[57] ABSTRACT

A device to form different shaped raviolis includes multiple uniquely outlined cutting and crimping ribs, surrounding finger ejection holes, and an extrusion die plate hand support system.

3 Claims, 1 Drawing Sheet

5,720,991

1
MULTI-SHAPED RAVIOLI MAKER

This is a continuation of Ser. No. 08/242,814, filed on May 16,1994, abandoned.

BACKGROUND

1. Field of Invention

The present invention is directed to a device to stamp pasta raviolis of various shapes.

2. Description of Prior Art

Ravioli makers have been around for many years. These devices come in many different configurations. One such device uses an ice cube tray-like platform and a hand operated roller to compress and cut ravioli contents; such as cheeses and/or meats and/or vegetables; between two sheets of pasta. Another exemplary device uses twin rollers, one with indents and cutting edges, the other, a flat cylindrical opposing surface, to compress and cut raviolis. Yet a third exemplary device uses a hand held single form stamper to compress and cut raviolis.

These devices, while generally efficient and effective, lack flexibility to create different shaped raviolis, and lack, in many cases, ease and comfort in their use.

SUMMARY OF INVENTION

The present invention improves on prior devices in many areas.

Advantages of the present inventions will become apparent from the following description and illustration of a preferred embodiment.

DETAILED DESCRIPTION OF PREFERRED EMBODIMENT

Figure 1:
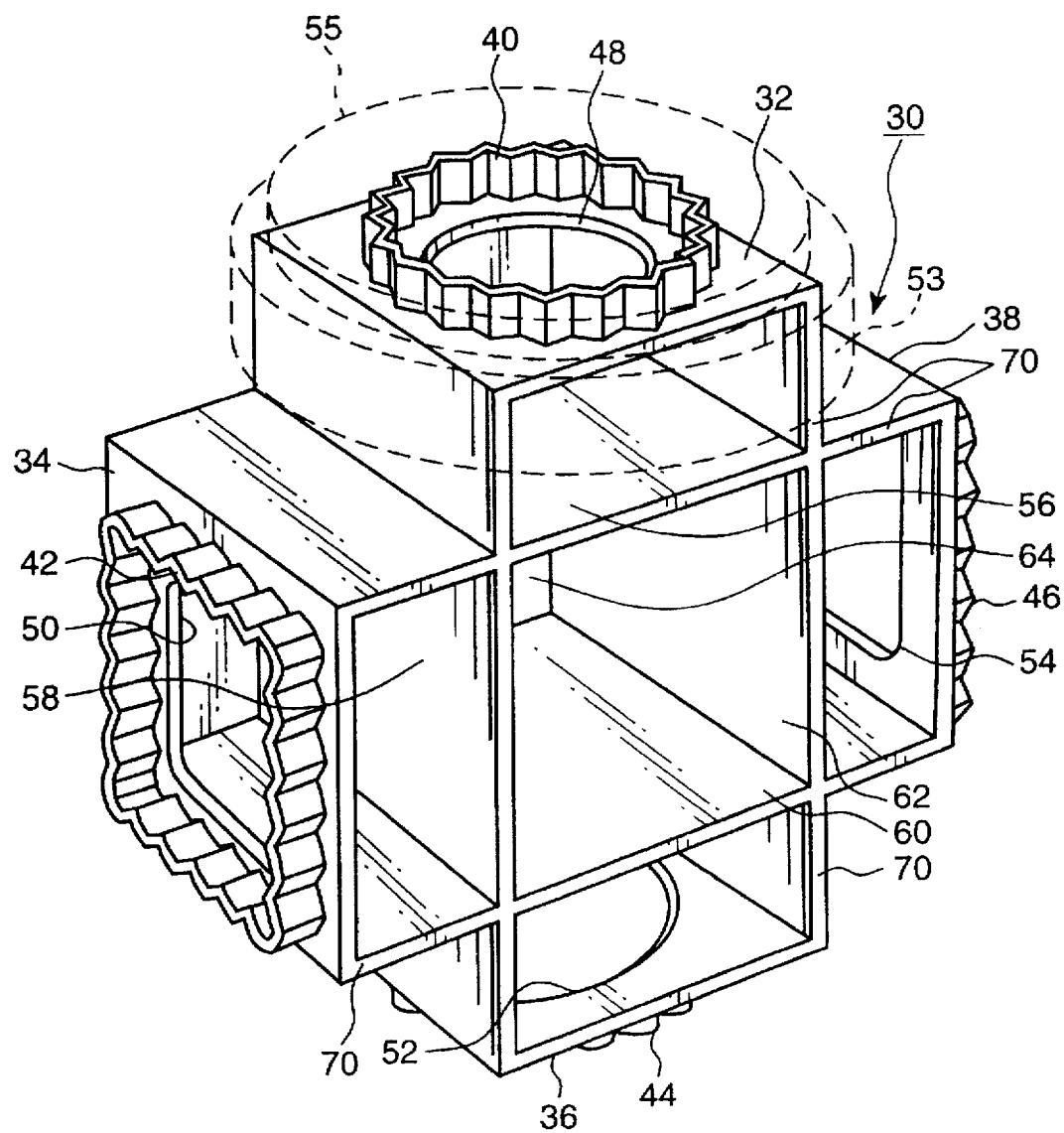
FIG. 1 is a perspective view of an embodiment constructed according to the present invention.

A preferred embodiment of the present invention has a cruciform shaped body 30 with four planer cutting 32, 34, 36, 38 surfaces located respectively, one each on each of the four tips of the cross. Each planer cutting surface 32, 34, 36, 38 has a raised fluted cutting edge 40, 42, 44, 46 surrounding an opening 48, 50, 52, 54 penetrating the planer cutting surface 32, 34, 36, 38.

Each of the cutting edges 40, 42, 44, 46 is configured to form, crimp and cut out a different shaped ravioli. As an example, one might form a circular ravioli using cutting edge 40, one a square ravioli using cutting edge 42, one an oblong ravioli using cutting edge 44, and one a triangular ravioli using cutting edge 46.

Each of the openings 48, 50, 52, 54 facilitate forming, cutting and ejecting the stamped raviolis. As an example, when a circular 40 ravioli is made, the opening 48 in the center of the cutting edge 40 allows space for the ravioli center to compress into, and allows a finger push hole to eject the ravioli if necessary, and the opening 48 is free of any surfaces which might cause the ravioli to stick in the center of the cutting surface 32.

The present invention may be used with a variety of pasta sheet forming devices. These range from hand rolling pins, and hand cranked or motor driven rollers, to manual and motorized pasta sheet extruders. Such pasta sheet extruders typically use circular extrusion dies 55 with annular rear facing retaining walls 53 showing in dotted lines on FIG. 1.

2

When using such a pasta extruder to prepare the ravioli dough, the preferred embodiment may be configured to fit one of the pasta extruder's extrusion dies 55 by placing the extrusion die 55 over one of the embodiment's cutting surfaces 32, 34, 36, 38, as shown in dotted lines in FIG. 1. The die 55 can thus be used to provide a comfortable surface on which hand pressure can be applied to form and cut the raviolis. As an example, the cutting surface 32, 34, 36, 38 may have a square or rectangular plan view and this square or rectangular surface is sized so that the corners fit snugly inside the extrusion die's 55 annular rear facing retaining wall 53. Thus the die 55 attaches with a friction fit to the cutting surface 32, 34, 36, 38 and provides a circular flat surface on which hand pressure can be applied to form and cut raviolis.

The preferred embodiment is strengthened by internal walls 56, 58, 60, 62 which connect the arms of the cruciformed shaped body. These walls 56, 58, 60, 62 directly transfer loads and reduce required wall thicknesses. A rear wall 64 also adds strength to the body's structure.

Each cutting surface 32, 34, 36 or 38 is supported spaced from its associated wall 56, 58, 60 or 62 by normally extending walls 70 attached along one edge to wall 56, 58, 60 or 62 and along its other edge to surface 32, 34, 36 or 38. The space within walls 70 underneath the cutting surfaces is open at each end to allow a finger to be inserted behind the surface to push out a cut ravioli, if necessary.

The embodiment may be constructed using various materials and methods known to those knowledgeable in the art. As an example, the embodiment may be injection molded from polypropylene or acetyl resins. Both such resins are easily cleaned and come in grades approved for direct food contact.

The embodiment may be constructed at any useful scale. As an example, it may be about three inches from top cutting surface to bottom cutting surface.

The embodiment improves On prior devices in many areas. As an example, when comparing the embodiment to devices which stamp only one shape of ravioli, the embodiment provides greater variety. The embodiment is compact relative to ice cube tray-like and roller type devices. The embodiment's extruder die hand support is more comfortable than narrow handles found on existent single shape ravioli stampers. The embodiment is economical to produce and easy to use when compared to bulky and expensive ice cube tray-like and roller type devices.

What has been described herein is an embodiment of the present invention. This description is presented as an illustration and an aid in understanding the present invention and in no way is intended to limit the scope of the present invention which is described by the claims contained herein. One knowledgeable in the art would readily recognize that many variations are possible without departing from the invention's basic concepts. Such variations might include, but are not limited to: using more or fewer cutting faces or changing their shape or layout; using other shaped ravioli cutters; cutting more than one ravioli using each face; having more than four cutting surfaces such as 2, 6 or 8 cutting surfaces on a rectangular, hexagonal or octagonal body; making a simple or compound curve on each of the cutting surfaces so a rocking motion might be used to cut and form the raviolis; eliminating the strengthening ribs between the cross' arms or on the back of the cruciform shaped body; using a dedicated custom made handle that attaches to the body instead of the extrusion die, making the embodiment cylindrical with two or more cutting blades on the perimeter wall, etc.

Such changes and modifications can be made without departing from the spirit and scope of the invention. Accordingly it is intended that all such changes and modifications be covered by the appended claims and their equivalents.

We claim:

1. A device to make ravioli pasta comprising:

a) a central support element having opposed parallel sides, the peripheral surface of the central support element between the opposed parallel sides defining an even number greater than two of contiguously joined cutter support surfaces;

b) a U-shaped element having two spaced apart legs and an interconnecting portion mutated on each cutter support surface to project from said each cutter support surface with the two legs of the U-shaped element integrally attached at their free ends to the outside of said each associated cutter support surface and with the interconnecting portion of the U-shaped element overlying and spaced away from the associated cutter support surface to define a space therebetween sufficient in which to insert a finger to push a cut ravioli to the outside;

c) each said interconnecting portion defining a central opening with a closed loop cutter element surrounding the central opening;

d) the U-shaped element being open on at least one side allowing ingress of a finger to the space defined between the U-shaped element and the outside of the cutter support surface to push a cut ravioli to the outside; and e) the respective closed loop cutting elements differing in configuration.

2. A device according to claim 1 wherein said peripheral surface of the central element is in the form of a cruciform with four contiguously joined cutter support surfaces, and has an open box-like construction with the cutter support surfaces joined to a support plate on one side of the central element and the opposite side being open.

3. A device according to claim 1 wherein the U-shaped elements are open on both sides.

* * * * *

UNITED STATES PATENT AND TRADEMARK OFFICE
CERTIFICATE OF CORRECTION

PATENT NO. : 5,720,991
DATED : February 24, 1998
INVENTOR(S) : Janet Gildersleeve; Ronald M. Popeil; Alan L. Backus It is certified that error appears in the above-indentified patent and that said Letters Patent is hereby corrected as shown below:

Column 2, line 37, change "improves On" to -- improves on --.
Column 3, line 13, change "mutated" to -- mounted --.

Signed and Sealed this

Fifteenth Day of December, 1998

Attest:

BRUCE LEHMAN

*Attesting Officer*        *Commissioner of Patents and Trademarks*